Figure 1:
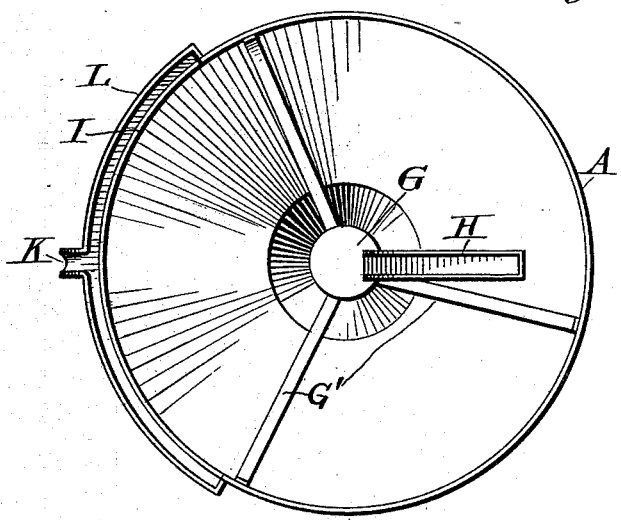

No. 714,822. Patented Dec. 2, 1902.
J. RANDALL.
SETTLING TANK OR DECANTING VESSEL.
(Application filed June 10, 1902.)
(No Model.)

UNITED STATES PATENT OFFICE.

JOHN RANDALL, OF DEADWOOD, SOUTH DAKOTA.

SETTLING-TANK OR DECANTING VESSEL.

SPECIFICATION forming part of Letters Patent No. 714,822, dated December 2, 1902.

Application filed June 10, 1902. Serial No. 111,049. (No model.)

*To all whom it may concern:*

Be it known that I, JOHN RANDALL, a citizen of the United States, residing at Deadwood, in the county of Lawrence and State of South Dakota, have invented certain new and useful Improvements in Settling-Tanks or Decanting Vessels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in settling-tanks or decanting vessels used in the "wet" treatment of ores whereby fine or flocculent material in a liquid is allowed to subside by gravity and then drawn off at the bottom, while the separated liquid having the precious metals in solution is allowed to decant or flow over a suitable lip at the upper edge of the vessel or tank.

The invention has for its object an improved form of tank whereby the subsidence of the flocculent material is more readily effected and the upward percolation having to pass through a decreased depth of flocculent material is hastened.

In operating devices of this character I have observed that the subsidence of light or flocculent solids in a liquid is greatly facilitated by making the decanting vessel quite shallow and that a considerable depth of the settler greatly retards the operation, as the upward percolation of the liquid, impelled only by a slight difference of specific gravity, is very slow when the liquid has to pass through a considerable depth of the subsiding material. This will be better understood when it is stated that in mill practice it is found possible to settle a sample of material in a laboratory vessel eight inches in depth, so that in half an hour the subsiding portion will only carry from fifty to fifty-five per cent. of moisture, while a tank charge of the same material twelve feet in depth requires to stand undisturbed from twenty-four to thirty hours in order to settle, and even then the subsided portion often carries as high as sixty per cent. moisture.

With this feature or principle in view an object of the invention is to construct a tank of such form as to have a maximum surface area at the top combined with minimum depth in order to increase the efficiency.

A further object is to provide means whereby the material to be treated can be introduced at or near and above the center of said tank, thereby securing important advantages, as hereinafter set forth; and for these purposes my invention consists of a settler-tank or decanting vessel preferably circular in horizontal section with very shallow sides and a conical or conoidal bottom, the important characteristic of which is that as it approaches in a downward slope toward a central discharge-opening the slope of said bottom becomes more and more steep or vertical. There may be one or more changes of slope, as shown, or said slope may be a curve beginning at or near the lower edge of the side and extending downward and more or less approaching a vertical line at the discharge-outlet near or at the center of the bottom thereof.

It further consists of the combination and arrangement of parts hereinafter set forth and claimed.

Figure 2:
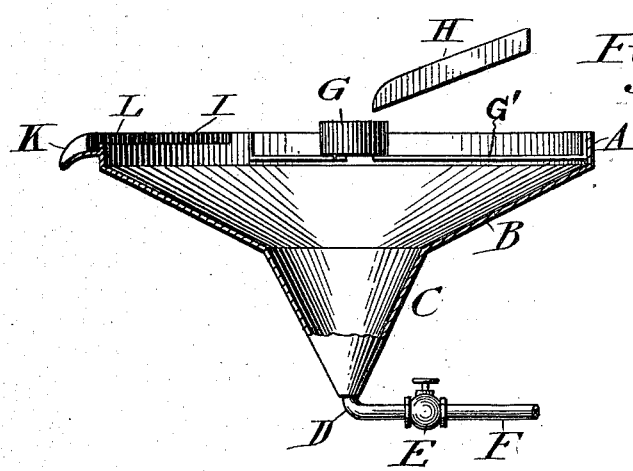

In the accompanying drawings, which form a part of this specification, Figure 1 is a plan view of a settling-tank embodying my invention, and Fig. 2 is a partial side and a partial sectional view of the same.

Similar letters indicate like parts in both figures of the drawings.

The settling-tank or decanting vessel is composed of steel or other suitable material capable of withstanding the action of the liquid or solution employed in and flowing through the same and is provided with a vertical side A at its upper edge of about one foot in height irrespective of the diameter or other dimensions thereof and preferably circular in horizontal section. The bottom, as shown, is formed of upper and lower slopes of different slants or inclinations. The upper slope B extends downward and inward from the foot of the side A about one-third of the diameter of the tank and is inclined about one foot vertical to two feet horizontal, while the lower slope C is inclined two feet vertical to one foot horizontal and extends inward from the lower edge of the slope B about onesixth of the diameter of the tank to the central bottom outlet D thereof. The said outlet D communicates with a pipe F, having a valve E therein.

Located over the outlet D and connected by suitable props or strips of metal G' to the side A at the upper portion of the tank is a cylindrical baffle-plate G, adapted to receive material from a trough H, receiving from any suitable source of supply, and guide the same into the center of said tank. The said baffle-plate extends into the tank, having its lower edge so as to be adapted to be below the surface of the liquid in the tank or, as shown in Fig. 2, extending nearly to the lower edge of the side A, whereby any agitation of the surface of the liquid by the incoming material is prevented. A portion of the upper edge of the side A is cut away, forming an overflow-lip I, over which the liquid in the tank may pass to the launder L, which encircles the said lip and is connected to the side A and is provided with a discharge-spout K. The lip I, with the launder L, may extend, as shown, only around a portion of the side or it may extend around nearly the entire side, as circumstances may require.

In operation the mixture—i. e., the flocculent material or earths and solution previously treated chemically, if desired, in order to coagulate suspended matter—is fed into the center of the vessel or tank from the spout H, and the heaviest of the solids therein sink at once in the liquid solution in the tank to the vicinity of the outlet D and there become entangled with the lighter solids slowly settling into that region and assist in dragging the same to the outlet D without the danger of banking up or forming "scaffolds" along any portion of said bottom. The somewhat lighter solids when first entering the tank spread outward and being freed from the heaviest do not pack or tend to hang up on the upper portion of the steep slope C. The still lighter particles spread out above the slope B, where a considerable area and limited depth promotes rapid subsidence. It is found in practice that light and flocculent materials even when considerably concentrated by subsidence still resemble fluids in mobility and have no disposition to bank up or adhere to the bottom even on a slope nearly approaching a level, but will slowly find their way to the lowest point if their specific gravity is greater than that of the liquids with which they are mixed. In this tank the thickened or concentrated solids, therefore, find their way with the least delay to the outlet D, whence they may be expelled by hydrostatic pressure, while the clarified liquid overflows at the lip I and is discharged from the spout K.

This form and construction of settling-tank is applicable in a continuously-operated system or process shown and described in application filed by me May 23, 1902, and serially numbered 108,722, series of 1900, wherein the said form of tank is shown, but not specifically described nor claimed.

Having thus described my invention, what I desire to claim and secure by Letters Patent is—

1. A settling-tank having a bottom formed of slopes of different inclinations and provided with a central outlet, substantially as described.

2. A settling-tank having a bottom with upper and lower slopes of conical form, the upper slope being of less inclination than the lower one, substantially as described.

3. A settling-tank having a bottom formed of upper and lower slopes of conical form, the upper slope being of less inclination than the lower one, but of greater width, substantially as described.

4. A settling-tank having vertical sides and a bottom composed of upper and lower slopes of different inclinations, the upper slopes being of less inclination than the lower, and substantially twice the width of the same, as and for the purpose set forth.

5. A settling-tank having a baffle-plate of cylindrical form directly above a central discharge-outlet in the bottom thereof, said baffle-plate being secured by metal strips to the upper portion of the sides of said tank and extending into the same below the top and nearly to the lower edge of the side thereof, substantially as and for the purpose set forth.

6. A settling-tank consisting of a body having a vertical side and a bottom formed of slopes of different inclinations and provided with a central outlet, the said side having a cut-away portion forming an overflow-lip, a launder encircling said lip and provided with a discharge-spout, a baffle-plate of cylindrical form connected by strips to the upper portion of said side and extending into the tank below the top and nearly to the lower edge of said side, and a pipe leading from said central outlet; said parts being combined substantially as described.

In testimony whereof I have signed my name to this specification in the presence of two subscribing witnesses.

JOHN RANDALL.

Witnesses:
 RAY D. HUBBARD,
 MILTON L. BALDY.